No. 765,840. PATENTED JULY 26, 1904.
D. JACKSON.
WAGON AXLE.
APPLICATION FILED MAY 3, 1904.
NO MODEL.

Witnesses-

Inventor:
Daniel Jackson

No. 765,840. Patented July 26, 1904.

UNITED STATES PATENT OFFICE.

DANIEL JACKSON, OF ST. GEORGE, CANADA.

WAGON-AXLE.

SPECIFICATION forming part of Letters Patent No. 765,840, dated July 26, 1904.

Application filed May 3, 1904. Serial No. 206,219. (No model.)

*To all whom it may concern:*

Be it known that I, DANIEL JACKSON, of the village of St. George, in the county of Brant, in the Province of Ontario, Canada, have invented certain new and useful Improvements in Wagon-Axles, of which the following is a specification.

My invention relates to improvements in wagon-axles; and the object of the invention is to devise an extremely simple, durable, and efficient means for attaching the tie-rods to the axle-arms; and it consists, essentially, of a bolt with a countersunk head and designed to pass through the end of the hollow axle-arm and through a hole in the end of the tie-rod, the parts being otherwise arranged and constructed in detail, as hereinafter more particularly explained.

Figure 2:
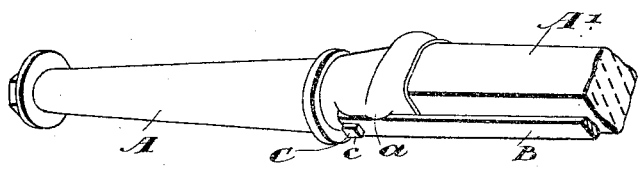
Figure 1:
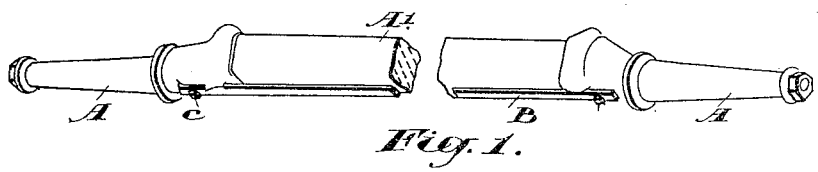
Figure 3:
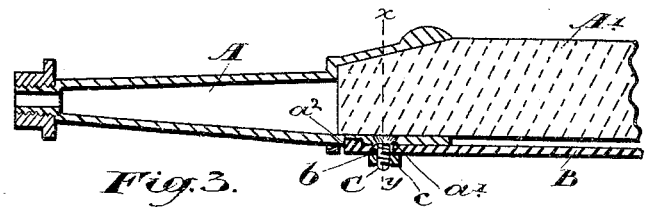
Figure 4:

Figure 1 is a perspective view of an axle intermediately broken away, showing the general appearance of my invention. Fig. 2 is an enlarged detail of one end of the axle and arm. Fig. 3 is a longitudinal section through one end of the axle and arm. Fig. 4 is a cross-section through the line $x\,y$, Fig. 3.

In the drawings like letters of reference indicate corresponding parts in each figure.

A represents the hollow axle-arms, into which the ends of the wooden portion A' of the axle extend.

$a\,a$ are two projections beneath each axle-arm and between which is formed a recess $a^2$, into which the upturned ends of the tie-rod B extend. By this means all side strain is removed from the bolt C.

C is a bolt which is provided with a countersunk head, the head of such bolt fitting into a corresponding hole $a'$ in the axle-arm. The bolt C extends through a hole $b$ in the tie-rod and is provided with a nut $c$ at the outer end. By means of such bolt and nut, as shown, the tie-rod is securely held in place, and thereby securely connects the axle-arm together.

Heretofore it has been the practice to use a clip-bolt and cross-plate and nuts and to turn up the end of the tie-rod and by means of the plate hold the tie-rod to the axle-arm, and this necessitated a much more expensive construction.

By my device I have reduced the cost to a minimum and have produced a stronger, better, and more durable device for connecting the axle-arms by the tie-rods.

What I claim as my invention is—

1. In combination, the axle, the axle-arm having a pair of projections with a free space between them opening downwardly, a tie-rod fitting between the projections and having an opening at its end beyond the said projection, a bolt fitting an opening countersunk on the interior of the axle-arm, said bolt passing from the axle-arm out through the opening in the tie-rod, and a nut on the outer end of the bolt bearing upon the tie-rod, substantially as described.

2. In combination, with the axle, an axle-arm having a pair of integral projections formed thereon, with a free space between them opening downwardly and having also an opening or recess to one side of the said projections, a tie-rod fitting in the space between the projections extending beyond the same and having an upturned end fitted to the opening in the axle-arm, a bolt fitted to an opening which is countersunk on the inner side of the said arm, said bolt passing through the tie-rod at a point beyond the projections, and having a nut on the end thereof, substantially as described.

DANIEL JACKSON.

Witnesses:
S. B. LAURASON,
H. FREEMAN.